Nov. 6, 1962 W. W. KENNEDY 3,062,234
AIR MIXING VALVE
Filed Jan. 7, 1960 2 Sheets-Sheet 1
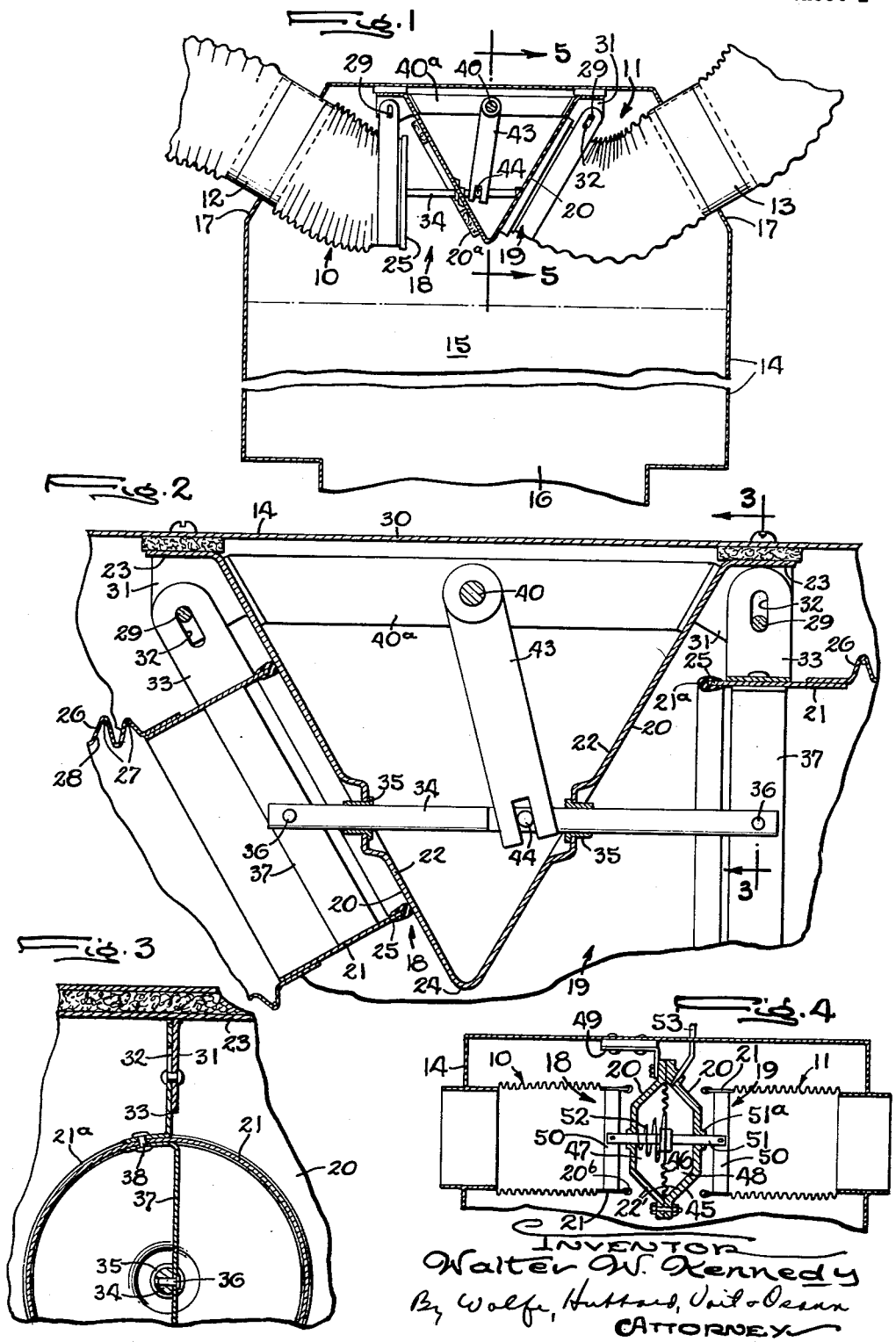
INVENTOR
Walter W. Kennedy
By Wolfe, Hubbard, Voit & Osann
ATTORNEY Nov. 6, 1962 W. W. KENNEDY 3,062,234
AIR MIXING VALVE
Filed Jan. 7, 1960 2 Sheets-Sheet 2
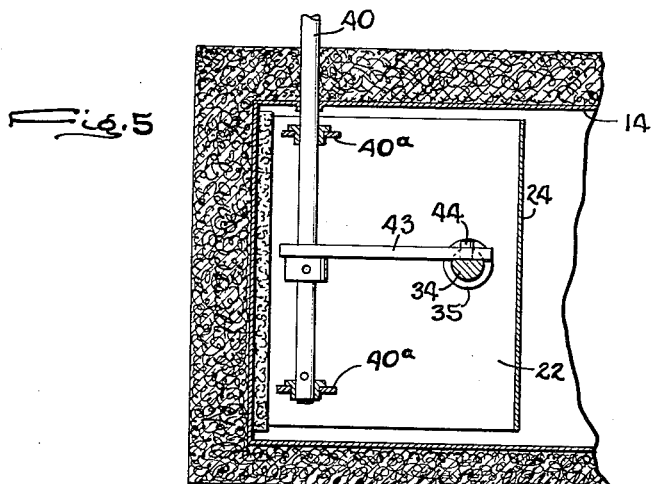
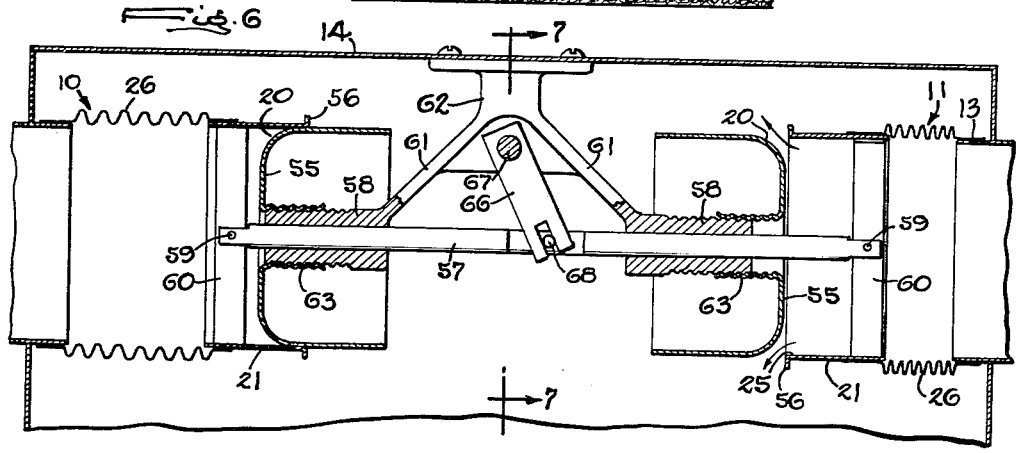
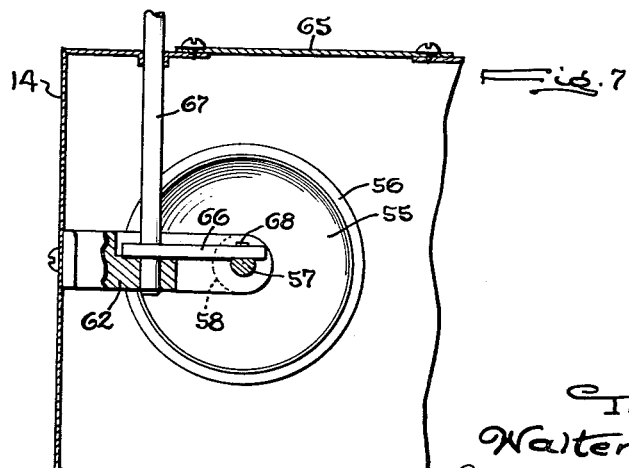
INVENTOR
Walter W. Kennedy
By Wolfe, Hubbard, Voit & Osann
ATTORNEY

United States Patent Office 3,062,234
Patented Nov. 6, 1962

3,062,234
AIR MIXING VALVE
Walter W. Kennedy, Rockford, Ill., assignor to Barber-Colman Company, Rockford, Ill., a corporation of Illinois
Filed Jan. 7, 1960, Ser. No. 997
10 Claims. (Cl. 137—607)

This invention relates to valves for regulating the flow of air under pressure in air conditioning systems and the general object is to improve the construction of such valves in a manner to reduce substantially the power required to close the valves.

Another object is to construct and mount the movable element of the valve in a novel manner so as to minimize the air pressure exerted in opposition to a power actuator by which the valve is positioned.

A more detailed object is to employ a movable valve element in the form of a flexibly mounted sleeve constituting the air inlet and supported for axial movement of its discharge end toward and away from a normally stationary member constituting the valve seat.

A further object is to provide an improved valve for mixing warm and cold air while reducing pressure losses within the mixing chamber and facilitating rapid mixing of the air streams.

Still another object is to provide a mixing valve of the above character in which the stationary valve seats constitute the casing of a power actuated valve operator.

Other objects and advantages of the invention will become apparent from the following detailed description taken in connection with the accompany drawings, in which FIGURE 1 is a fragmentary longitudinal section of an air mixing valve embodying the novel features of the present invention.

FIG. 2 is an enlarged cross sectional view of a part of FIG. 1.

FIG. 3 is a fragmentary section taken along the line 3—3 of FIG. 2.

FIG. 4 is a view similar to FIG. 1 showing a modification.

FIG. 5 is a fragmentary section taken along the line 5—5 of FIG. 1.

FIG. 6 is a view similar to FIG. 2 of another modification.

FIG. 7 is a section taken along the line 7—7 of FIG. 6.

The invention is shown in the drawings incorporated in a device for mixing in different controlled proportions hot and cold air delivered under pressure through supply ducts 10 and 11. Herein the latter include collars 12 and 13 sealed into and extending through walls of a box 14 suitably insulated as shown in FIG. 5 and defining a mixing chamber 15. In the form shown in FIGS. 1 to 3, the collars are mounted in plates 17 extending diagonally of the end and side walls of the box and constituting the box corners.

The mixed air is discharged from the box through an outlet 16 which is somewhat larger in cross sectional area than either of the inlet ducts. With this outlet connected to a building air distributing system in accordance with accepted practice, the mixed air, even after its pressure has been reduced below the inlet pressure, will flow freely out of the box without a possibility of the pressure building up to a value approaching the inlet pressure.

The flow of air from the supply ducts into the box is regulated by valves 18 and 19 which, in accordance with the present invention, are constructed in a novel manner such that the area of the movable valve element exposed to the supply pressure is extremely small thus correspondingly reducing the torque required to close the valve.

To these ends, each valve comprises generally a stationarily mounted seat 20 which, in the forms shown in FIGS. 1 to 4, is of larger area than the cross section of the supply duct whose sleeve-like inner end 21 constitutes the movable valve element and is shiftable axially into and out of full abutment with the seat. Sealing of the valve closed may be accomplished by covering the seats with a thin ring 20ª of felt (see FIG. 1) coacting with the end 25 of the sleeve or this end may be formed by a ring 21ª of rubber or other yieldable material fitting over the sleeve end.

To facilitate rapid mixing of the two air streams and to minimize pressure losses within the valve structure, the valve seats 20 are formed on and backed by rigid metal plates 22 disposed between the duct ends and converging toward each other in the direction of flow of the mixed air stream toward the outlet 16. The outer edge of each plate is flanged at 23 and screwed or otherwise secured against the end wall 30 of the casing, the inner ends of the plates being joined together at an apex 24.

The relatively rigid ring or short sleeve 21 constituting the duct end is mounted for axial movement of its free end 25 into and out of abutment with the seat 20, the other end of the sleeve being telescoped with and sealed into a section 26 of the duct in the form of a flexible tube which is extensible and contractible axially and also adapted to bend laterally. The tube is composed of flexible material corrugated longitudinally and helically and reinforced by a helix 27 of resilient wire seated in and extending around an internal groove 28 in the flexible tube.

In the form shown in FIGS. 1 to 3, the sleeves 21 are mounted loosely to swing about pivots 29 disposed adjacent the end wall 30 of the box and paralleling the valve seats 20. Herein each pivot is mounted in an ear 31 on the plate 22 and is received loosely in a radially elongated slot 32 formed in a lug 33 riveted to and projecting outwardly from the side of the sleeve at a point so spaced from the end thereof as to permit the entire circumference of the sleeve end 25 to come into full sealing abutment with the seat 20 when the valve is closed as in the case of the valve 19 shown in FIG. 1. As the sleeve 21 is swung away from the seat about the axis 29 as permitted by bending of the flexible section 26, the sleeve end 25 is disposed at different angles relative to the plate 22, the valve 18 being fully open in the position shown in FIG. 1. In the fully open position of either sleeve 21, the area of the opening between the sleeve end 25 and the seat 20 is substantially equal to the cross-sectional area of the sleeve.

To utilize the valves 18 and 19 for varying the proportions of hot and cold air delivered through the ducts 11 and 12 and therefore the temperature of the air discharged through the outlet 16, the two sleeves 21 are joined together for back and forth movement in unison. Herein, the connection comprises a rod 34 of round cross-section projecting through and guided for endwise movement in bushings 35 supported by the plates 22. The outer ends of the rods are disposed within the duct ends and in this instance are joined by pivot pins 36 to cross bars 37 extending diametrically across and riveted at 38 to opposite sides of the sleeves 21. It will be apparent that the elongated slots 32 permit the duct ends to swing into full abutment with valve seats 20.

Various types of power actuators may be coupled to the rod 34 to move the same back and forth and thereby open and close one of the valves while correspondingly closing and opening the other valve. When the operator is located outside of the mixing box 14, its output shaft 40 is extended through a side wall of the box between the plates 22 and fixed to a crank 43 forked at its free end and straddling a cross-pin 44 on a milled off side of the rod.

As shown in FIG. 5, the shaft 40 extends through and is journaled in bearings mounted in bars 40ª spanning the plates 22 with their opposite ends welded or otherwise secured to the plates. This arrengement permits the valve seats 20, the actuator shaft 40, the valve sleeves 21 and the connecting flexible sections 26 to be formed and joined together as a unit adapted to be assembled conveniently in the box 14 simply by bolting the flanges 23 to the wall 30 of the box 14.

If desired, the operator, when of the fluid actuated type, may be disposed within the mixing chamber and the housing thereof utilized to form the stationary seats 20 of the two valves 18 and 19. Such a modification is shown in FIG. 4 in which the inlet ducts 10 and 11 are extended through opposite walls of the box 14 in axial alinement with each other. In this instance, the two valve seats are formed by the oppositely facing external surfaces of plates 22′ having frusto-conical outer edge portions adapted for abutment with the seal rings 20ᵇ at the ends of the valve sleeves 21.

The flat outer edges of the plates 22′ are bolted together and clamped to opposite sides of a flexible disk 46 dividing the housing 45 into two chambers 47, 48. The operator housing thus formed is bolted to a bracket 49 so as to center the conical valve seats 20 on the axis of the inlet ducts and valve sleeves 21. The latter are coupled by internal cross bars 50 to pivots on opposite ends of an actuator rod 51 extending through sealed guides 51ª at the centers of the plates 22′ and also through a hole in the center of the diaphragm to which the rod is fixed.

A spring 52 coiled about the rod within the chamber 47 acts in compression to urge the rod in a direction to close the valve 18 and open the valve 19. Movement of the rod in the opposite direction results from the admission of pressure fluid into the chamber 48 through a passage 53 extending outwardly through the operator casing and communicating through a control valve (not shown) with a source of fluid such as compressed air under sufficient pressure to overcome the spring. The magnitude of the pressure determines the extent of the diaphragm movement. The admission of pressure fluid to and the release from the chamber 48 may be controlled thermostatically in a manner well understood in the art to proportion the relative opening of the valves 18 and 19 and maintain a desired temperature of the mixed air within the chamber 15.

Instead of making the valve seats 20 of larger area than the sleeves 21, the seats may be formed, as shown in FIG. 6, by the oppositely facing surfaces of disks 55 sized to telescope with a close sliding fit into the ends 25 of the movable sleeves 21. In this instance, the disks constitute the bottoms of cups somewhat rounded at their outer edges and the duct ends 25 are formed by flanges 56 turned outwardly at the ends of the sleeves 21. As before, a rod 57 is guided for endwise movement in bushings 58 at the centers of the cup bottoms and with its ends pivotally connected at 59 to cross bars 60. The latter are fixed to and extend diametrically across the interior of the sleeves 21 and are spaced far enough from the sleeve ends 25 to always remain out of contact with the cups when the valve is closed as in the case of the valve 18 shown in FIG. 6. Endwise movement of the rod in either direction extends the flexible section 26 of one duct 10 or 11 and correspondingly contracts the section of the other duct axially thereby closing the valve at the end of the first duct and correspondingly closing the other valve.

The bushings 58 are formed on the outer ends of arms 61 diverging from a bracket 62 which is fastened to one wall of the box 14. The cups 55 are formed with hubs 63 internally threaded and screwed onto external threads on the bushings 58 so that by turning either bushing about the rod 57, its axial position relative to the other cup and valve seat 20 may be adjusted. Access to the cups 55 for such adjustment may be had through a hand hole (FIG. 7) in the adjacent wall of the box 14 after removal of its cover 65. By such individual adjustment of the cups defining the valve seats 20, it is possible to vary the degree of opening of either valve when the other valve is closed and thereby obtain any desired proportioning of the warm and cold air delivered through the ducts 10 and 11.

Separating the bracket arms 61 from each other provides space for an arm 66 fast on a shaft 67 which is journaled in bearings on the bracket 62 and a wall of the box 14 and extends outwardly through a wall of the box 14 for connection to a suitable power operator for rocking the shaft back and forth and thereby open one of the valves while closing the other. The arm is forked at its free end to straddle a cross pin 68 on the rod 57.

It will be observed that in each form of the improved air valve, the end 25 is the only surface on the movable valve element or sleeve 21 which is subjected to the pressure of the air delivered through the supply duct. In view of the small size of this area, the power required to shift the sleeves 21 back and forth is correspondingly small thus permitting the two valves to be actuated by an operator of substantially smaller capacity than has been possible heretofore. At the same time, the inclusion of the extensible sections 26 in the inlet ducts permits the fully open position of one valve to be varied relative to that of the other valve as illustrated in FIG. 6.

By converging the stationary valve seats 20 toward each other as shown in FIG. 1, the major portion of the air delivered through each valve is directed toward the outlet 16. This results not only in immediate and effectual mixing of the two air streams but in a minimum drop in the pressure of the air passing through the valves to the outlet 16.

Still another important advantage of the arrangements described is the reduction in the noise resulting from the low frequency vibrations transmitted through the supply ducts leading from the blower which induces the air flow through the ducts. That is to say, since the air is delivered through the movable valve sleeve 21 and impinges on the stationary plate 22, the vibrations are reflected in a manner well understood back along the duct and at least partially dissipated thus reducing the level of the low frequency noise transmitted on past the valves.

I claim as my invention:

1. An air mixing device having, in combination, a casing having an outlet in one side wall, first and second plates smaller in area than said casing and stationarily mounted within the casing with the two plates converging substantially to an apex opposite said outlet, an inlet duct extending into said casing and terminating in a sleeve with its free end disposed opposite and adapted for full abutment with said first plate and cooperating with the latter to form a first valve, said duct having a flexible section within said casing bendable laterally and axially extensible to permit movement of the sleeve end toward and away from said first plate, means on the side of said duct remote from said outlet hinging said sleeve for swinging of its end toward and away from said first place, a second valve including a second similarly constructed inlet duct extending into said casing and having an inner end defined by a sleeve and similarly hinged to said second plate for movement into and out of abutment with such plate, a connection joining said two sleeves together with one valve closed when the other is fully open, and means for shifting said connection back and forth to open one valve and close the other valve progressively during movement of said connection in either direction.

2. An air mixing device as defined in claim 1 in which said connection comprises an endwise slidable rod extending through said plates and joined to said sleeves, and said shifting means includes a member movable about a fixed axis and disposed between said plates.

3. An air valve comprising a casing having an air outlet, an inlet duct extending into said casing through a wall thereof and having a flexible section within the casing adapted for axial expansion and contraction, a sleeve forming the inner end of said duct, a seat larger in area than the inner end of said sleeve, means stationarily mounting said seat within said casing for full abutment with the free end of said sleeve to interrupt the flow of air through the duct, stationary means supporting said sleeve for swinging thereof, by bending of said flexible section, about a hinge axis extending generally tangentially of the sleeve on the side thereof remote from said outlet, and means for swinging said sleeve about said axis toward and away from said seat to regulate the flow of air out of said duct into said casing for escape through said outlet.

4. An air valve comprising a casing having an air outlet, an inlet duct extending into said casing through a wall thereof and having a flexible section within the casing adapted for axial expansion and contraction, a sleeve forming the inner end of said duct, a seat larger in area than the inner end of said sleeve, means stationarily mounting said seat within said casing for full abutment with the free end of said sleeve to interrupt the flow of air through the duct, stationary means supporting said sleeve for swinging thereof, by bending of said flexible section, about a hinge axis extending generally tangentially of the sleeve on the side thereof remote from said outlet, and means for swinging said sleeve about said axis toward and away from said seat to regulate the flow of air out of said duct into said casing for escape through said outlet, said supporting means including a means to allow lateral shifting of said hinge axis and said sleeve across said seat.

5. An air mixing device having, in combination, a casing having an outlet in one side wall, first and second members smaller in area than said casing and stationarily mounted within the casing to define first and second valve seats facing in different directions, an inlet extending through and supported by a second wall of said duct and including a flexible and axially extensible tube disposed within said casing and carrying at its inner end a relatively rigid ring disposed opposite and cooperating with said first seat to form a valve which is closed and opened by movement of the ring toward and away from the seat and extension and contraction of said flexible tube, a second valve including a similarly constructed and mounted duct including a flexible and axially extensible tube within the casing and a ring at the inner end thereof cooperating with said second valve seat, a connection extending through said members and joined to said rings within the peripheries of the rings while leaving the ends of the rings free for sealed engagement with said valve seats, and means coupled to said connection between said members and mounted on said casing for back and forth movement to shift said rings in unison and progressively open one of said valves while correspondingly closing the other valve.

6. An air mixing device as defined in claim 5 in which said connection comprises a rod movable endwise through said members and joined to radially extending bars disposed within and secured to said rings.

7. An air mixing device as defined in claim 6 in which the intermediate portion of said rod is disposed in a space between said valve seats and includes an operator coupled to said rod within said space.

8. An air mixing device as defined in claim 7 in which said actuator includes a rock shaft projecting into said casing and carrying an arm disposed in said space and pivotally coupled at its free end to said intermediate portion of said rod.

9. An air mixing device as defined in claim 5 including an axially flexible diaphragm fixed to said rod, means defining chambers on opposite sides of said diaphragm between said members and cooperating with said diaphragm to form a fluid pressure actuator for said rod, and means for admitting pressure fluid to at least one of said chambers to vary the position of said diaphragm and the extent of opening of said valves.

10. An air mixing device as defined in claim 7 in which said valve seats comprise the oppositely facing closed ends of axially alined cups and said rings comprise sleeves adapted to telescope with said cup ends.

References Cited in the file of this patent

UNITED STATES PATENTS

| | | |
|---|---|---|
| 2,559,116 | Doschek | July 3, 1951 |
| 2,831,326 | Richards | Apr. 22, 1958 |

FOREIGN PATENTS

| | | |
|---|---|---|
| 517,386 | France | Dec. 17, 1920 |